UNITED STATES PATENT OFFICE.

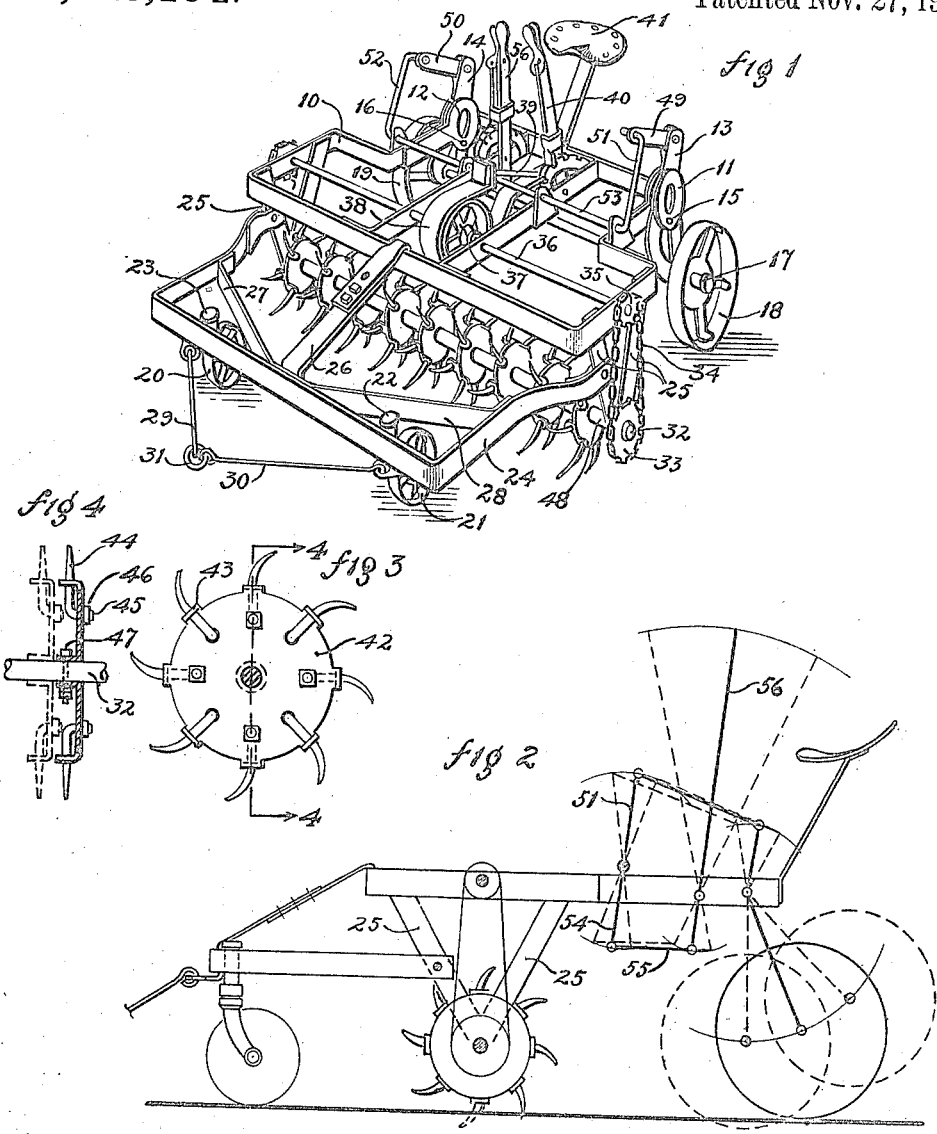

CLARENCE J. SPRAGUE, OF LOS ANGELES, CALIFORNIA.

CULTIVATOR.

1,248,194.   Specification of Letters Patent.   Patented Nov. 27, 1917.

Application filed May 31, 1917. Serial No. 172,090.

*To all whom it may concern:*

Be it known that I, CLARENCE J. SPRAGUE, a citizen of the United States, residing at Los Angeles, in the county of Los Angeles and State of California, have invented new and useful Improvements in Cultivators, of which the following is a specification.

This invention relates to an agricultural implement and particularly pertains to a cultivator.

In farming, when the ground is to be cultivated, spring or rigid toothed harrows are often used. When a stone, or other obstruction is encountered by these members it is necessary that the tooth frames be raised to clear them. This operation causes an area of fifteen inches or more, to be left uncultivated and if the teeth have been collecting dead grass and other weeds, these will be dropped upon the field, thereafter to take root. It is the principal object of this invention to provide a cultivator embodying the use of rigid cultivating teeth which are mounted in such a manner as to automatically relieve themselves when striking obstructions and passing thereover without difficulty, as well as constantly insuring that the harrow teeth will be in the ground at all times.

Another object of this invention is to provide a frame arrangement upon which the cultivator teeth are mounted and which may be easily drawn and readily controlled by an operator who may be seated thereupon.

Another object of this invention is to provide simple means whereby the cultivator teeth will offer variable resistance to the soil through which they are being drawn, said resistance being adjustably controlled in a positive manner.

Another object of this invention is to provide readily operated means for varying the depth of penetration of the teeth without interference with the continuous operation of the implement.

Another object of this invention is to provide a series of rotating units upon which the teeth may be detachably mounted and which will permit the teeth of various designs to be secured.

Another object of this invention is to provide mountings for the units which will permit them to be variably spaced transversely of the machine and in relation to each other.

It is a further object of this invention to provide an agricultural implement of the above class which is simple in its operation, durable in its construction and may be conveniently handled.

Other objects will appear hereinafter.

The invention is illustrated, by way of example, in the accompanying drawings in which:

Figure 1 is a view in perspective illustrating the complete agricultural implement and particularly disclosing the correlation of the vital parts.

Fig. 2 is a side view illustrating, in a diagrammatical manner, the running gear of the implement, the cultivating members, and the control adjustment for the depth of penetration of the members.

Fig. 3 is a view in elevation illustrating one of the toothed units.

Fig. 4 is a view in transverse section, as seen on the line 4—4 of Fig. 3, illustrating the sectional formation of one of the units and further illustrating the disposition of a second unit thereto, as shown in dotted lines.

Referring more particularly to the drawings, 10 indicates the main frame of the implement. This frame, as here shown, is substantially T-shaped, having a wide portion extending the width of the implement, and a narrow rearwardly extending portion upon which the control mechanism is mounted. At the opposite sides of the rear portion of the frame are bearings 11 and 12, between which vertically pivoted axle arms 13 and 14 are positioned. These arms are held in pivotal relation to the frame by means of pivot bolts 15 and 16. The arms extend downwardly beneath the frame and are fitted with wheel spindles 17 upon which traction wheels 18 and 19 are rotatably secured. These wheels support the rear of the implement.

The forward end of the frame 10 is supported by caster wheels 20 and 21 which are rotatably secured upon caster mountings 22 and 23. These mountings are held within a forwardly extending auxiliary frame portion 24 which is of U-shape. The terminating ends of this frame are rigidly secured to downward extensions 25 formed upon the main frame proper. A central reinforcing member 26 secures the frame to the main frame and is supplemented by diagonal braces 27 and 28. Drag links 29 and 30 are pivotally secured to the auxiliary frame and are connected at their outer ends by a ring 31. Any suitable traction means may be fastened to this ring and by it the implement may be drawn.

Extending transversely of the main frame is a shaft 32 which is rotatably secured beneath the frame within the ends of the downward extension brackets 25. Mounted upon the outer ends of this shaft are sprocket wheels 33 around which sprocket chains 34 pass. These chains connect with sprockets 35 which are mounted upon a brake shaft 36. The shaft 36 extends parallel to the shaft 32 and is fitted with a brake drum 37 around which a brake band 38 is wrapped. One end of this band is secured rigidly to the frame, while the opposite end is fastened to a swinging arm 39 adapted to be raised and lowered by movement of a brake lever 40. This lever is positioned adjacent a seat 41 which is occupied by the driver. Mounted upon the shaft 32 are a series of disks 42 which are formed with central hubs adapted to fit around the shaft and which have oppositely extending, alternately arranged ears 43 which extend at right-angles to the body of the disk and parallel to the shaft. These ears are formed with central openings through which the shanks of various implements may be positioned. In the present instance the tools are harrow teeth 44 which extend through the openings in the ears and are formed with turned threaded ends 45 secured to the disks by nuts 46. It will be understood that the disks may be fastened upon the shaft 32 by bolts 47, as indicated in Fig. 4, or may be fastened and spaced in relation to each other by spacing collars 48, as shown in Fig. 1. The teeth extend radially from the disk and thus may be brought to penetrate the soil and be dragged therethrough.

In order that the implement may be easily adjusted to determine the depth of penetration of the teeth, the pivoted axle arms 13 and 14 are connected by links 49 and 50 to crank arms 51 and 52. These arms form a part of a crank shaft 53 having a downwardly extending throw 54. The throw of the crank is connected by a link 55 with an adjusting lever 56.

In operation, the shaft 32 is fitted with a desired number of disks 42 which are spaced from each other to meet the requirements of the soil to be worked. These disks are supplied with small plow shares, harrow teeth, or other members which will penetrate the soil. The lever 56 is then operated to swing the rear wheels 18 and 19, as indicated in the diagram, thus causing the frame to be raised and lowered and positively moving the shaft 32 to raise and lower the harrow teeth. When the proper depth of penetration has been reached, the lever 56 may be set by engagement with its quadrant. The implement may then be drawn by suitable traction means. When it is first started the brake band 38 is drawn to produce sufficient frictional resistance upon the drum 37 to hold the shaft 32 against rotation, care being taken to insure that the band will permit the shaft to rotate when obstructions are encountered. As the harrowing operation is continued, the lower-most teeth will drag through the soil. When an obstacle is encountered, the shaft 32 will be rotated in opposition to the retarding action of the band brake and will relieve the teeth so that they will not need to be raised from the ground. As the shaft 32 rotates, another set of teeth will come in contact with the soil and the former set will be relieved, thus insuring that the soil will be acted upon at all times.

It will thus be seen that an agricultural implement is here provided for a variety of uses and that it will act in a more desirable manner than most implements of similar character in present use.

While I have shown the preferred construction of my cultivator as now known to me, it will be understood that various changes in the combination, construction and arrangement of parts may be made by those skilled in the art without departing from the spirit of my invention.

I claim:

1. An agricultural implement, comprising a main frame, a pair of supporting wheels positioned beneath the rear end of said frame, means whereby they may be simultaneously adjusted in relation to the frame, caster wheels mounted beneath the forward end of the frame, a transverse shaft rotatably secured beneath the frame, a series of cultivating tool units, means whereby they may be spaced in relation to each other upon the shaft, and a friction brake by which the shaft may be retarded in its rotation.

2. An agricultural implement comprising a main frame, a pair of supporting wheels at the rear of the frame, means whereby the main frame may be raised and lowered relative to the wheels, caster wheels at the front of the main frame, a shaft mounted transversely in the main frame, toothed cultivator tools mounted upon the shaft and adapted to rotate the shaft as the implement is drawn forwardly, a countershaft mounted parallel with the first shaft, sprockets and chains connecting the countershaft to the first shaft, and a brake mechanism for the countershaft.

In testimony whereof I have signed my name to this specification.

CLARENCE J. SPRAGUE.